US011162383B2

(12) United States Patent
Kington et al.

(10) Patent No.: US 11,162,383 B2
(45) Date of Patent: Nov. 2, 2021

(54) SYSTEM AND METHOD FOR CLEANING COOLING PASSAGES OF A COMBUSTION CHAMBER

(71) Applicant: HONEYWELL INTERNATIONAL INC., Morris Plains, NJ (US)

(72) Inventors: Harry Lester Kington, Scottsdale, AZ (US); Nagaraja S. Rudrapatna, Chandler, AZ (US); Vladimir K. Tolpygo, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/678,476

(22) Filed: Nov. 8, 2019

(65) Prior Publication Data
US 2020/0095940 A1 Mar. 26, 2020

Related U.S. Application Data

(63) Continuation of application No. 15/431,907, filed on Feb. 14, 2017, now Pat. No. 10,519,868.

(51) Int. Cl.
F01D 25/00 (2006.01)
F02C 7/18 (2006.01)
F02C 7/30 (2006.01)
F01D 25/02 (2006.01)
(Continued)

(52) U.S. Cl.
CPC .............. F01D 25/002 (2013.01); F02C 7/18 (2013.01); F02C 7/30 (2013.01); F01D 25/02 (2013.01);
(Continued)

(58) Field of Classification Search
CPC .............. F02C 7/30; F23R 2900/03041; F01D 25/002; F01D 25/02
See application file for complete search history.

(56) References Cited

U.S. PATENT DOCUMENTS 4,065,322 A 12/1977 Langford
6,279,322 B1 8/2001 Moussa
(Continued)

FOREIGN PATENT DOCUMENTS

CH 660056 * 3/1987 ............. F01D 25/00
CH 660056 A5 3/1987
(Continued)

OTHER PUBLICATIONS

Extended EP Search Report for Application No. 18156387.5 dated Jun. 5, 2018.
(Continued)

Primary Examiner — Todd E Manahan
Assistant Examiner — Alyson Joan Harrington
(74) Attorney, Agent, or Firm — Lorenz & Kopf, LLP

(57) ABSTRACT

Systems and methods are provided for cleaning one or more cooling passages associated with a combustion chamber of a gas turbine engine. The gas turbine engine has a compressor section upstream from the combustion section. The method includes receiving a pressurized fluid from a source and directing the pressurized fluid through an inlet of a chamber such that a portion of a plurality of particles within the chamber is entrained within the pressurized fluid. The method includes injecting the pressurized fluid with the entrained portion of the plurality of particles downstream from the compressor section through an end wall of a diffuser and deswirl system upstream from a combustor plenum of the combustion section to clean the one or more cooling passages associated with the combustion chamber.

14 Claims, 7 Drawing Sheets

(52) U.S. Cl.
CPC ...... *F05D 2220/32* (2013.01); *F05D 2230/72* (2013.01); *F05D 2240/35* (2013.01); *F05D 2260/204* (2013.01); *F23R 2900/03041* (2013.01)

(56) References Cited

U.S. PATENT DOCUMENTS

| | | |
|---|---|---|
| 7,185,663 B2 | 3/2007 | Koch et al. |
| 7,531,048 B2 | 5/2009 | Woodcock et al. |
| 8,371,814 B2 | 2/2013 | Ramachandran et al. |
| 9,631,814 B1 | 4/2017 | Barton et al. |
| 2009/0084411 A1 | 4/2009 | Woodcock et al. |
| 2013/0019895 A1 | 1/2013 | Hughes et al. |
| 2016/0186601 A1* | 6/2016 | Manning ............... F01D 25/005 415/121.2 |
| 2017/0254217 A1 | 9/2017 | Eriksen et al. |

FOREIGN PATENT DOCUMENTS

| | | |
|---|---|---|
| EP | 2899368 A1 | 7/2015 |
| JP | 2001214755 A | 8/2001 |

OTHER PUBLICATIONS

Whitaker, S.M. et al.; The Effect of Particle Loading, Size, and Temperature on Deposition in a Vane Leading Edge Impingement Cooling Geometry, Proceedings of ASME Turbo Expo 2016: Turbomachinery Technical Conference and Exposition GT2016; Jun. 13-17, 2016, Seoul, South Korea; GT2016-57413.

* cited by examiner

SYSTEM AND METHOD FOR CLEANING COOLING PASSAGES OF A COMBUSTION CHAMBER

CROSS-REFERENCE TO RELATED APPLICATION

This application is a continuation of U.S. patent application Ser. No. 15/431,907 filed on Feb. 14, 2017. The relevant disclosure of the above application is incorporated herein by reference.

TECHNICAL FIELD

The present disclosure generally relates to gas turbine engines, and more particularly relates to a system and method for cleaning cooling passages, such as effusion holes, in a combustion chamber of a gas turbine engine.

BACKGROUND

Gas turbine engines may be employed to power various devices. For example, a gas turbine engine may be employed to power a mobile platform, such as an aircraft, rotorcraft, etc. In the example of the gas turbine engine powering a mobile platform, certain operating environments, such as desert operating environments, may cause the gas turbine engine to ingest fine sand and dust particles. The ingestion of the fine sand and dust particles may obstruct one or more cooling passages associated with a portion of the gas turbine engine, such as the combustor. The obstruction of the one or more cooling passages may reduce an effectiveness of a cooling of the combustion chamber, which may reduce a life expectancy for the combustion chamber.

Accordingly, it is desirable to provide a system and a method for cleaning cooling passages in a combustion chamber, which removes fine particles, such as fine sand and dust particles from the one or more cooling passages to enable effective cooling of the combustion chamber. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for cleaning one or more cooling passages associated with a combustion chamber of a gas turbine engine. The gas turbine engine has a compressor section upstream from the combustion chamber. In one embodiment, a method includes: receiving a pressurized fluid from a source; directing the pressurized fluid through an inlet of a chamber such that a portion of a plurality of particles within the chamber is entrained within the pressurized fluid; and injecting the pressurized fluid with the entrained portion of the plurality of particles downstream from the compressor section through an end wall of a diffuser and deswirl system of the gas turbine engine or through a plenum upstream from the combustion chamber to clean the one or more cooling passages associated with the combustion chamber.

In one embodiment, a system for cleaning one or more cooling passages associated with a combustion chamber of a gas turbine engine is provided. The gas turbine engine includes a compressor section upstream from the combustion chamber and a diffuser and deswirl system downstream from the compressor section. The system includes a source of a pressurized fluid. The system also includes a chamber including a plurality of particles having a predetermined particle size distribution. The chamber having an inlet in fluid communication with the source to receive the pressurized fluid and an outlet in fluid communication with an end wall of the diffuser and deswirl system or a plenum upstream from the combustion chamber. At least a portion of the plurality of particles entrained in the pressurized fluid flows through the chamber to clean the one or more cooling passages associated with the combustion chamber.

Further provided is a system for cleaning one or more cooling passages associated with a combustion chamber of a gas turbine engine. The gas turbine engine includes a compressor section upstream from the combustion chamber and a diffuser and deswirl system downstream from the compressor section. The system includes a chamber including a plurality of aluminum oxide particles having a predetermined particle size distribution. The chamber has an inlet and an outlet. The system includes an inlet conduit fluidly coupled to the outlet of the chamber and to an end wall of the diffuser and deswirl system. The system includes an outlet conduit fluidly coupled to a plenum and the inlet of the chamber. The plenum is upstream from the combustion chamber and downstream from the diffuser and deswirl system. The outlet conduit directs pressurized fluid bled from the plenum into the chamber, and the pressurized fluid entrains at least a portion of the plurality of particles. The pressurized fluid with the entrained portion of the plurality of particles is injected via the inlet conduit through the end wall of the diffuser and deswirl system to clean the one or more cooling passages associated with the combustion chamber.

Further provided is a method for cleaning one or more cooling passages associated with a combustion chamber of a combustor section of a gas turbine engine. The gas turbine engine having a compressor section upstream from the combustion section, and the method comprising: receiving a pressurized fluid from a source; directing the pressurized fluid through an inlet of a chamber such that a portion of a plurality of particles within the chamber is entrained within the pressurized fluid; and injecting the pressurized fluid with the entrained portion of the plurality of particles downstream from the compressor section through an end wall of a diffuser and deswirl system upstream from a combustor plenum of the combustion section to clean the one or more cooling passages associated with the combustion chamber.

Also provided is a system for cleaning one or more cooling passages associated with a combustion chamber of a gas turbine engine. The gas turbine engine includes a compressor section upstream from the combustion chamber and a diffuser and deswirl system downstream from the compressor section. The system includes a source of a pressurized fluid, and a chamber including a plurality of particles having a predetermined particle size distribution. The chamber has an inlet in fluid communication with the source to receive the pressurized fluid and an outlet in fluid communication with an end wall of the diffuser and deswirl system to clean the one or more cooling passages associated with the combustion chamber. At least a portion of the plurality of particles are entrained in the pressurized fluid that flows through the chamber to clean the one or more cooling passages associated with the combustion chamber. The outlet positioned downstream from the compressor section and upstream from a combustor plenum of the combustion section in a direction of a working fluid flow through the gas turbine engine.

Further provided is a system for cleaning one or more cooling passages associated with a combustion chamber of a gas turbine engine. The gas turbine engine includes a compressor section upstream from the combustion chamber and a diffuser and deswirl system downstream from the compressor section. The system includes a chamber including a plurality of aluminum oxide particles having a predetermined particle size distribution. The chamber has an inlet and an outlet. The system includes an inlet conduit fluidly coupled to the outlet of the chamber and to an end wall of the diffuser and deswirl system. The system includes an outlet conduit fluidly coupled to an external pressurized fluid source and the inlet of the chamber. The outlet conduit directs pressurized fluid from the external pressurized fluid source into the chamber, and the pressurized fluid entrains at least a portion of the plurality of particles. The pressurized fluid with the entrained portion of the plurality of particles is injected via the inlet conduit through the end wall of the diffuser and deswirl system to clean the one or more cooling passages associated with the combustion chamber.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any component of a gas turbine engine that would benefit from the removal of accumulated fine particles, and that the removal of the accumulated fine particles from the combustion chamber described herein is merely one exemplary embodiment according to the present disclosure. Moreover, while the system and method for cleaning cooling passages is described herein as being used with a combustion chamber of a gas turbine engine onboard a mobile platform or vehicle, such as a bus, motorcycle, train, motor vehicle, marine vessel, aircraft, rotorcraft and the like, the various teachings of the present disclosure may be used with a gas turbine engine associated with a stationary platform, or may be used to address similar cleaning requirements in other types of systems. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale. Those skilled in the art will appreciate that embodiments of the present disclosure may be practiced in conjunction with any number of systems, and that the systems described herein is merely exemplary embodiments of the present disclosure. Furthermore, the connecting lines shown in the various figures contained herein are intended to represent example functional relationships and/or physical couplings between the various elements.

Figure 1:
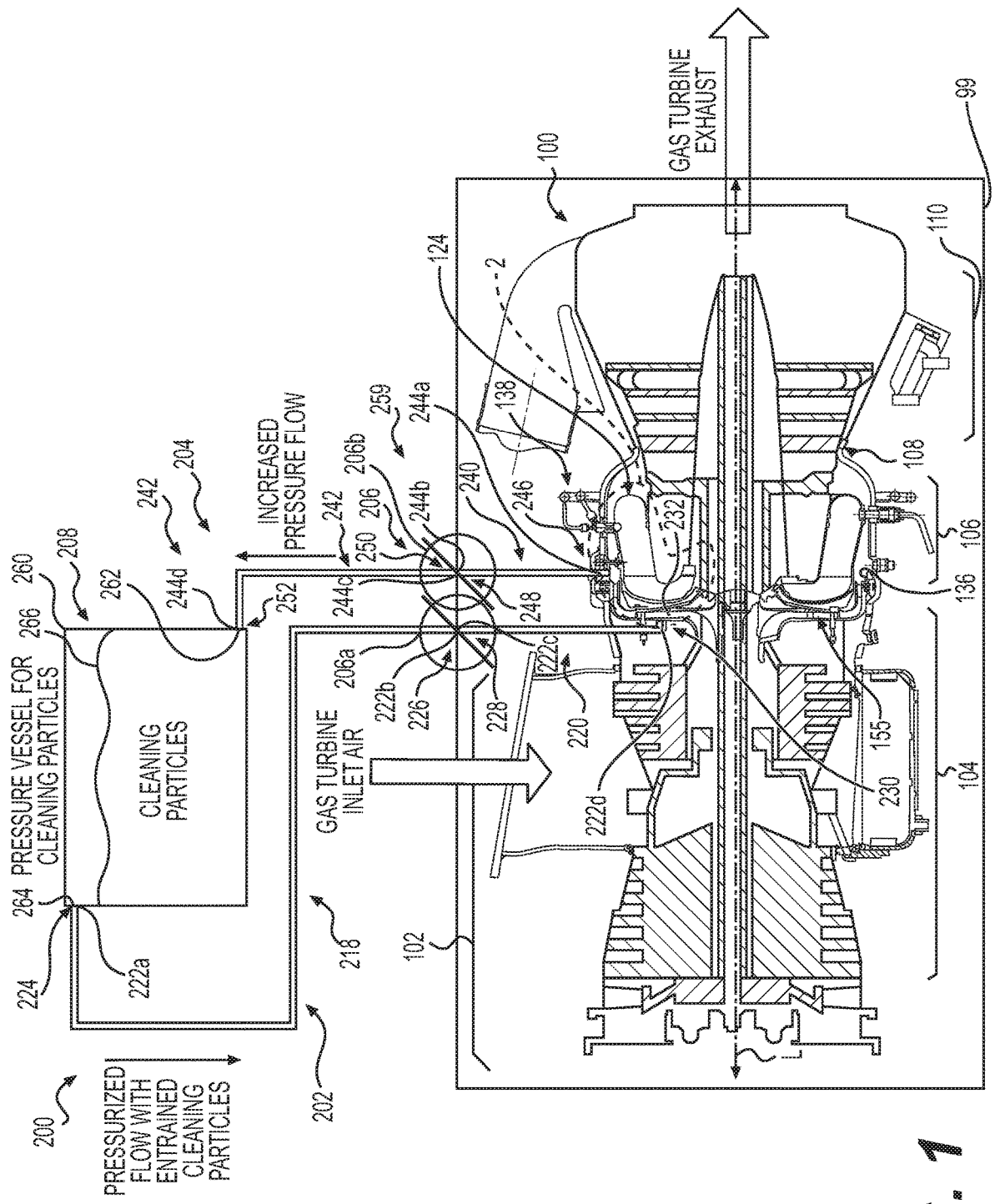
FIG. 1 is a schematic cross-sectional illustration of a gas turbine engine including a cooling passage cleaning system according to the various teachings of the present disclosure.

A partial, cross-sectional view of a single shaft, twin centrifugal compressor, three stage axial turbine, with a reverse flow annular combustor is shown as an exemplary gas turbine engine 100 in FIG. 1. In the depicted embodiment, the gas turbine engine 100 is for use with an aircraft 99, although other arrangements and uses may be provided. The gas turbine engine 100 may be, for example, an industrial, automotive, or Aerospace gas turbine such as a generator or compressor set, an auxiliary power unit, a turboshaft, a turboprop, or a turbofan system. As will be discussed herein, one or more cooling passages of a combustion chamber of the gas turbine engine 100 may be cleaned by a cooling passage cleaning system 200, 400 of the present disclosure to remove accumulated fine particles, such as fine sand and dust particles, from the one or more cooling features or passages, such as one or more effusion holes. By removing the fine particles obstructing the cooling features or passages, such as the fine sand and dust particles, the cooling efficacy of the combustion chamber is improved, which thereby improves the operation of the gas turbine engine 100. Moreover, removing the accumulated fine particles from the one or more cooling passages improves a life expectancy of the combustion chamber, may increase the time interval for required maintenance and also may reduce replacement and repair costs associated with the combustion chamber.

In this example, the gas turbine engine 100 includes an inlet section 102, a compressor section 104, a combustor section 106, a turbine section 108, and an exhaust section 110 and extends along a longitudinal axis L. Air is directed by the inlet section 102 into the compressor section 104. In the embodiment of FIG. 1, the compressor section 104 includes two centrifugal compressor stages connected to a three stage axial turbine. However, in other embodiments, the compressor may be axial, centrifugal or a combination of axial and centrifugal stages. The compressor section 104 may be of a single shaft or multiple shaft configuration. In the depicted embodiment, the compressor section 104 raises the pressure of the air and directs a majority of the high pressure air into the combustor section 106 via a diffuser and deswirl system 155. A fraction of the compressed air bypasses the combustor section 106 and is used to cool, among other components, vanes and blades in the turbine section 108.

In the embodiment of FIG. 1, the combustor section 106 includes a plenum or combustor plenum 136 receiving the air from the compressor section 104, a fuel delivery system 138 and combustion chamber 124, in which the high pressure air is mixed with fuel and combusted. The high-temperature combusted air is then directed into the turbine section 108. In this example, the turbine section 108 includes three turbines disposed in axial flow stages. However, it will be appreciated that the number of turbines, and/or the configurations thereof, may vary. In this embodiment, work is extracted from the high pressure and temperature air exiting the combustor section 106. The power generated by the turbine stages drive equipment in the gas turbine engine, compressors, etc. and provide shaft power to other elements of the aircraft 99; generators, pumps, etc.

Figure 2:
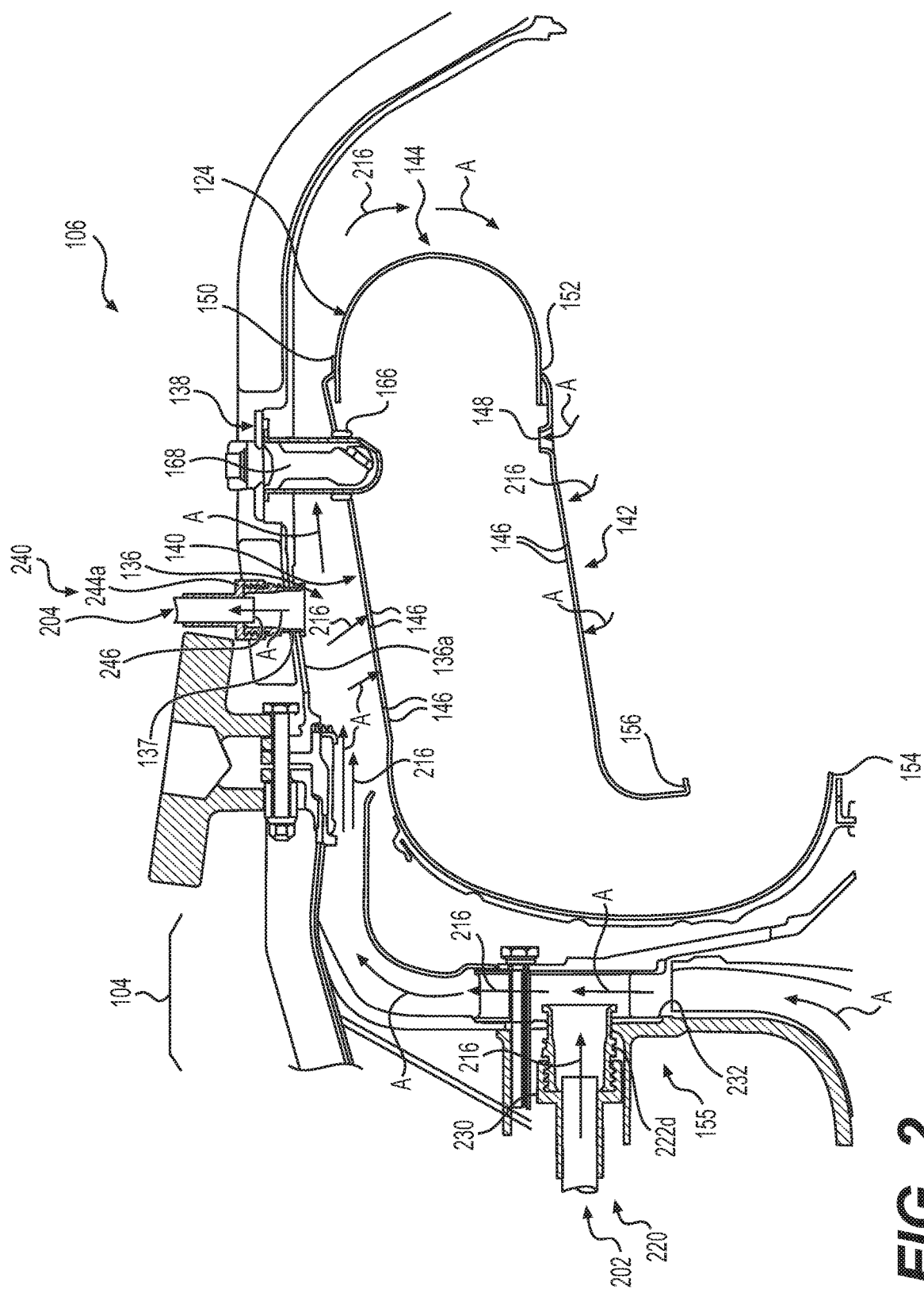
FIG. 2 is a detail cross-sectional illustration of a portion of the gas turbine engine of FIG. 1, identified at 2 in FIG. 1, which includes a portion of the cooling passage cleaning system.

With reference to FIG. 2, a portion of the combustor section 106 of the exemplary gas turbine engine 100 of FIG. 1 is shown in greater detail. In this example, the combustor plenum 136 is upstream from the combustion chamber 124 and supplies the combustion chamber 124 with at least air received from the diffuser and deswirl system 155. Thus, the combustor plenum 136 is upstream from the combustion chamber 124 and is downstream from the diffuser and deswirl system 155. The combustor plenum 136 is defined by an annular outer wall 136a, which is spaced apart from a first annular outer wall 140 of the combustion chamber 124 to define a fluid flow passage for the air received from the diffuser and deswirl system 155. The fuel delivery system 138 of the combustor section 106 includes one or more fuel delivery components, such as one or more fuel injectors 168.

The combustion chamber 124 is defined between the first annular outer wall 140, a second annular inner wall 142 and an interconnecting wall or dome 144. The first annular outer wall 140 is positioned substantially opposite the second annular inner wall 142 to define the combustion chamber 124. The first annular outer wall 140 and the second annular inner wall 142 each define a plurality of cooling features or passages 146 and a plurality of inlet bores 148 about a circumference of the first annular outer wall 140 and the second annular inner wall 142. The first annular outer wall 140 and the second annular inner wall 142 each extend from a respective first end 150, 152 to a respective second end 154, 156. The dome 144 is substantially U-shaped, and is coupled to the first end 150, 152 of each of the first annular wall outer 140 and the second annular inner wall 142 to enclose the combustion chamber 124.

In this example, the plurality of cooling passages 146 is a plurality of effusion cooling holes, which are each defined through the first annular outer wall 140 and the second annular inner wall 142. The plurality of cooling passages 146 may be defined through the first annular outer wall 140 and the second annular inner wall 142 to enable a portion of the air from the compressor section 104 to pass through the first annular outer wall 140 and the second annular inner wall 142 to cool each of the first annular outer wall 140 and the second annular inner wall 142. Generally, air is received from the diffuser and deswirl system 155, which is downstream of the compressor section 104, and the air flows from the compressor section 104 along a path indicated by arrows A. The plurality of cooling passages 146 may be defined through each of the first annular outer wall 140 and the second annular inner wall 142 in various patterns and spacings, which are predetermined based on the cooling requirements of the first annular outer wall 140 and the second annular inner wall 142.

Figure 3:
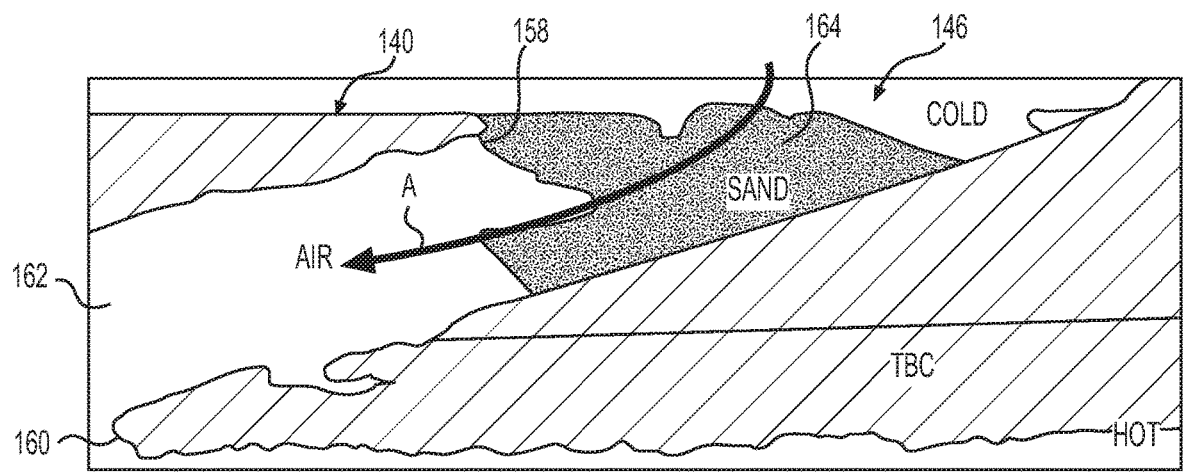
FIG. 3 is a cross-sectional view of one of a plurality of cooling passages associated with a combustion chamber of the gas turbine engine of FIG. 1, taken along line 3-3 of FIG. 4, which illustrates an accumulation of fine particles within the one of the plurality of cooling passages.

With reference to FIG. 3, an exemplary one of the plurality of cooling passages 146 is shown in greater detail. In this example, the cooling passage 146 is defined though the first annular outer wall 140, and has an inlet 158, an outlet 160 and a passageway 162 defined by the first annular outer wall 140. It should be noted that the plurality of cooling passages 146 associated with the second annular inner wall 142 are substantially similar to the one of the plurality of cooling passages 146 illustrated in FIG. 3. The inlet 158 receives a portion of the pressurized air from the compressor section 104, which flows through the passageway 162 and exits into the combustion chamber 124 via the outlet 160, as indicated by the arrow A. As the pressurized air from the compressor section 104 is at a lower temperature than the pressurized air within the combustion chamber 124, the flow of pressurized air through the passageway 162 cools the first annular outer wall 140 or the second annular inner wall 142. During certain operating conditions, such as in an operating environment that includes fine sand and dust particles, the fine particles may be drawn into the gas turbine engine 100 via the inlet section 102 (FIG. 1). As the fine particles pass through the compressor section 104, coarser particles that may also be ingested through the inlet section 102 are reduced to fine particles as they interact with the compressor components and along with the ingested fine particles pass through the compressor section 104 (FIG. 1), and flow with the pressurized air from the compressor section 104 into one or more of the plurality of cooling passages 146. As indicated in FIG. 3, the fine particles, such as the fine sand and dust particles, may accumulate at the inlet 158 and within the passageway 162 near the inlet 158. An exemplary accumulation of the fine particles, such as fine sand particles, is indicated by reference numeral 164. As shown, in certain instances, the accumulation of fine particles 164 may at least partially or substantially completely obscure the inlet 158, such that an amount of pressurized air that enters the passageway 162 for cooling is reduced or substantially eliminated. This reduction in the pressurized cooling air may reduce the life of the combustion chamber 124. As will be discussed, the cooling passage cleaning system 200, 400 substantially removes the accumulation of fine particles 164, which thereby restores the flow of pressurized cooling air through each of the plurality of cooling passages 146.

With reference to FIG. 2, the plurality of inlet bores 148 are defined through the first annular outer wall 140 and the second annular inner wall 142 near, adjacent to or at the respective first end 150, 152. The plurality of inlet bores 148 each generally have a diameter, which is greater than a diameter of each of the plurality of cooling passages 146. The plurality of inlet bores 148 enable the air from the compressor section 104 to enter the combustion chamber 124 for combustion.

Figure 4:
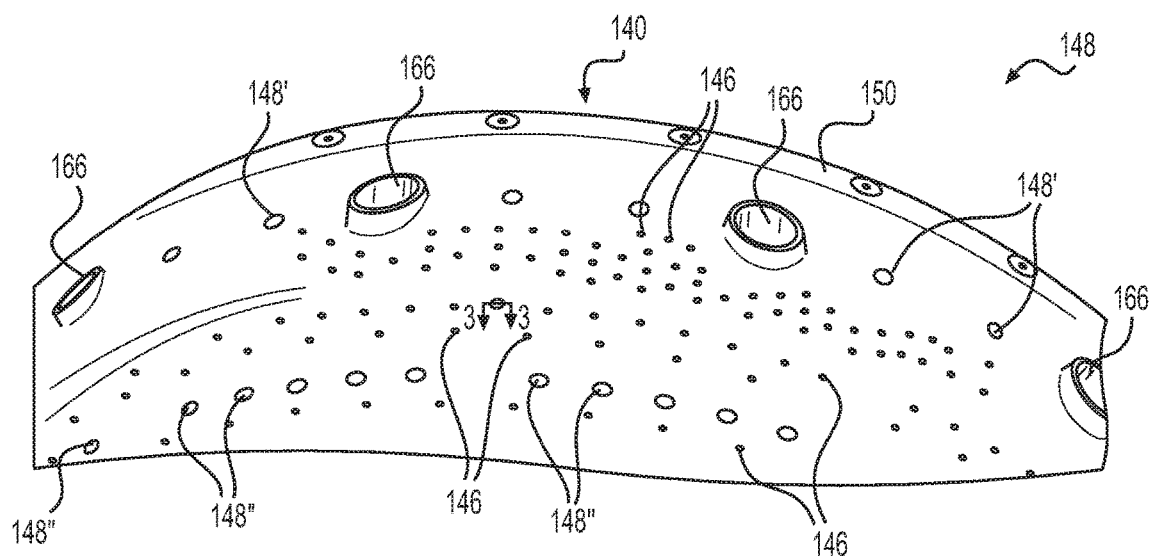
FIG. 4 is a top view of a first wall of a combustion chamber of the gas turbine engine of FIG. 1, which illustrates a portion of the plurality of cooling passages.
Figure 5:
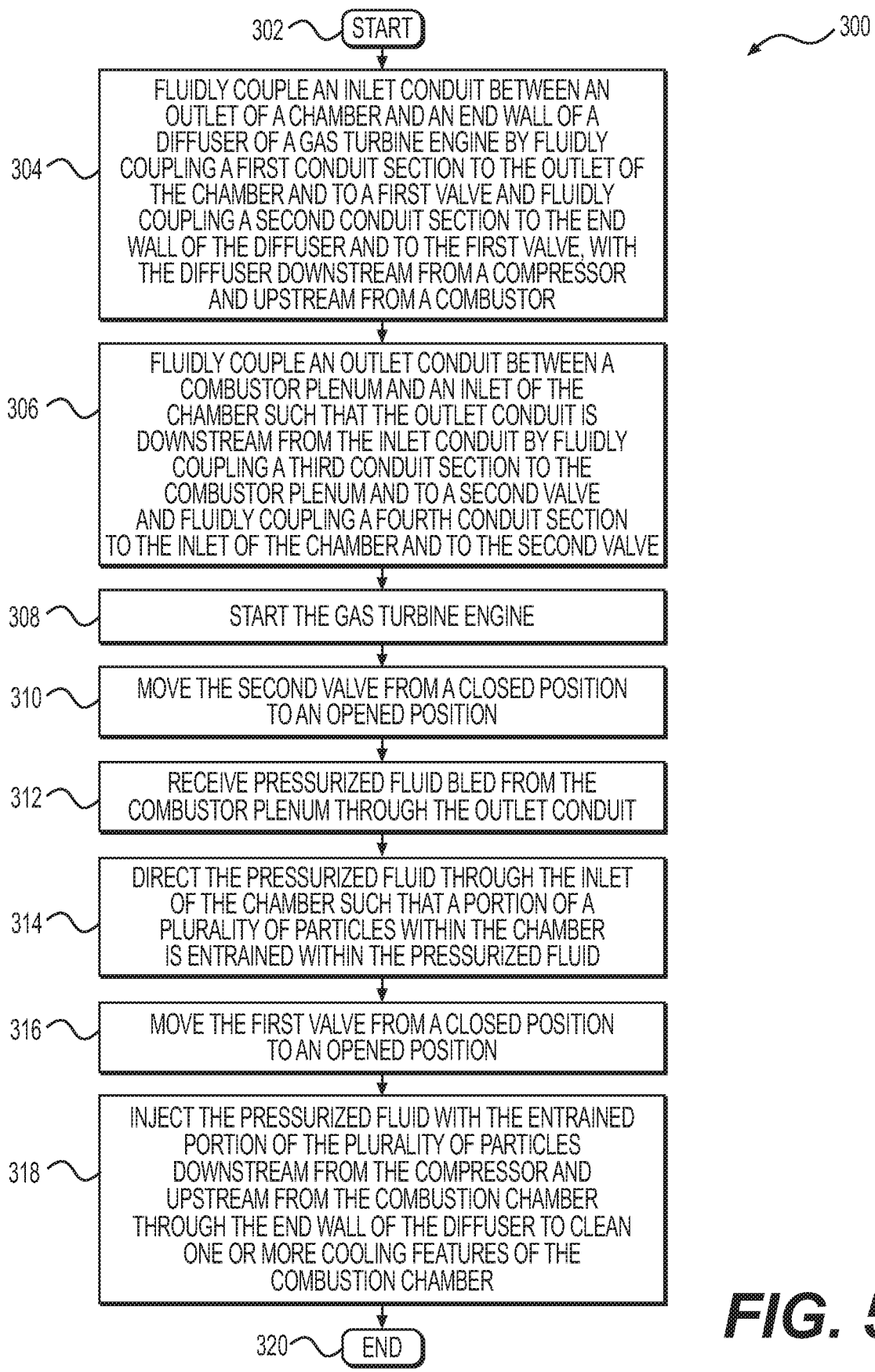
FIG. 5 is a flow chart illustrating an exemplary method for cleaning the plurality of cooling passages of the combustion chamber of the gas turbine engine of FIG. 1.

The first annular outer wall 140 also defines a plurality of fuel injector bores 166 about the circumference of the first annular outer wall 140 near, adjacent to or at the first end 150. Each of the fuel injector bores 166 receives a respective fuel delivery component, such as the fuel injector 168. Generally, each of the plurality of fuel injector bores 166 are spaced apart by one or more of the plurality of inlet bores 148. For example, with brief reference to FIG. 4, a top view of a portion of the first annular outer wall 140 of the combustion chamber 124 is shown. In this example, the fuel injector 168 is removed from each of the plurality of fuel injector bores 166 for clarity. As shown, the plurality of fuel injector bores 166 are spaced apart by a respective one or more of the plurality of inlet bores 148. In addition, in this example, the first annular outer wall 140 includes a first plurality of inlet bores 148' and a second plurality of inlet bores 148" spaced apart from each other about the circumference of the first annular outer wall 140. It should be understood, however, that the first annular outer wall 140 may have any predetermined arrangement of inlet bores 148.

With reference to FIG. 1, the cooling passage cleaning system 200 includes a first or inlet conduit 202, a second or outlet conduit 204, at least one valve 206 and a particle chamber or chamber 208. In this example, the at least one valve 206 includes a first valve 206a and a second valve 206b. The cooling passage cleaning system 200 may also include a controller and a user device, which is in communication with the controller to receive input commands to open or close the at least one valve 206 for cleaning the accumulated fine particles 164 from each of the plurality of cooling passages 146 of the combustion chamber 124.

The first or inlet conduit 202 is coupled to the chamber 208 and to the gas turbine engine 100. The inlet conduit 202 fluidly couples the chamber 208 to the diffuser and deswirl system 155 of the gas turbine engine 100 to enable the introduction of a cleaning fluid 216 (FIG. 2) into the gas turbine engine 100. In one example, the inlet conduit 202 includes a first conduit section 218, a second conduit section 220 and a plurality of couplings 222a-d. It will be understood, however, that the inlet conduit 202 may comprise a single conduit between the chamber 208 and the diffuser and deswirl system 155, if desired.

In this example, the first conduit section 218 is a flexible pneumatic hose, and includes a first inlet end 224 and a first outlet end 226. The first inlet end 224 includes the coupling 222a, which fluidly couples the first inlet end 224 to the chamber 208. The first outlet end 226 includes the coupling 222b, which fluidly couples the first conduit section 218 to the first valve 206a. As will be discussed, the first valve 206a is movable between an opened position and a closed position to enable the first conduit section 218 to be fluidly coupled to the second conduit section 220.

The second conduit section 220 is disposed substantially entirely or wholly within the aircraft 99, and is a flexible pneumatic hose. The second conduit section 220 includes a second inlet end 228 and a second outlet end 230. The second inlet end 228 includes the coupling 222c, which fluidly couples the second conduit section 220 to the first valve 206a such that movement of the first valve 206a to the opened position fluidly couples the second conduit section 220 to the first conduit section 218. The second outlet end 230 includes the coupling 222d, which fluidly couples the second conduit section 220 to an end wall 232 of the diffuser and deswirl system 155. Generally, the second conduit section 220 is coupled to the end wall 232 of the diffuser and deswirl system 155 such that the inlet conduit 202 is downstream from the compressor section 104; and upstream from the combustion chamber 124. The coupling 222d may be received within a bore defined through the end wall 232 or may be disposed about a bore defined through the end wall 232 to enable fluid communication between the chamber 208 and the diffuser and deswirl system 155 via the end wall 232.

In one example, each of the couplings 222a-d are pneumatic quick disconnect couplings that enable fluid communication between the chamber 208, the first conduit section 218, the second conduit section 220, the first valve 206a and the diffuser and deswirl system 155. It should be noted that while the couplings 222a-d are described and illustrated herein as comprising quick disconnect couplings, any coupling that enables fluid communication between the chamber 208 and the diffuser and deswirl system 155 via the inlet conduit 202 may be employed.

The second or outlet conduit 204 is coupled to the gas turbine engine 100 and to the chamber 208. The outlet conduit 204 fluidly couples the combustor plenum 136 of the gas turbine engine 100 to the chamber 208 to enable the chamber 208 to be pressurized with air from the gas turbine engine 100. In one example, the outlet conduit 204 includes a third conduit section 240, a fourth conduit section 242 and a second plurality of couplings 244a-d. It will be understood, however, that the outlet conduit 204 may comprise a single conduit between the combustor plenum 136 and the chamber 208, if desired.

In this example, the third conduit section 240 is disposed substantially entirely or wholly within the aircraft 99, and is a flexible pneumatic hose. The third conduit section 240 includes a third inlet end 246 and a third outlet end 248. The third inlet end 246 includes the coupling 244a, which fluidly couples the third inlet end 246 to the combustor plenum 136. The coupling 244a may be received within a bore defined through the combustor plenum 136 or may be disposed about a bore 137 defined through the combustor plenum 136 to enable fluid communication between the combustor plenum 136 and the chamber 208. Generally, the third inlet end 246 is coupled to the combustor plenum 136 so as to be downstream from the second outlet end 230 in the direction of airflow A through the gas turbine engine 100 as shown in FIG. 2. Stated another way, the inlet conduit 202 is coupled to the combustor plenum 136 so as to be upstream from the outlet conduit 204 in the direction of airflow A through the gas turbine engine 100. Generally, the third conduit section 240 is coupled to the combustor plenum 136 such that the outlet conduit 204 is also downstream from the compressor section 104 and upstream from the combustion chamber 124. As the velocity of the air at the location of the second outlet end 230 in the diffuser and deswirl system 155 is greater than the velocity of the air at the location of the third inlet end 246 in the combustor plenum 136, the entrained particles in the cleaning fluid 216 are carried downstream through the diffuser and deswirl system 155, into and through the combustor plenum 136 with a minimum return of the entrained particles through the third inlet end 246. With reference back to FIG. 1, the third outlet end 248 includes the coupling 244b, which fluidly couples the third conduit section 240 to the second valve 206b. As will be discussed, the second valve 206b is movable between an opened position and a closed position to enable the third conduit section 240 to be fluidly coupled to the fourth conduit section 242.

The fourth conduit section 242 is a flexible pneumatic hose, and includes a fourth inlet end 250 and a fourth outlet end 252. The fourth inlet end 250 includes the coupling 244c, which fluidly couples the fourth conduit section 242 to the second valve 206b such that movement of the second valve 206b to the opened position fluidly couples the fourth conduit section 242 to the third conduit section 240. The fourth outlet end 252 includes the coupling 244d, which fluidly couples the fourth conduit section 242 to the chamber 208. Generally, the fourth conduit section 242 is coupled to the chamber 208 to provide the chamber 208 with pressurized air bled from the combustor plenum 136, downstream from the compressor section 104 and upstream from the combustion chamber 124.

In one example, each of the couplings 244a-d are pneumatic quick disconnect couplings that enable fluid communication between the chamber 208, the third conduit section 240, the fourth conduit section 242, the second valve 206b and the diffuser and deswirl system 155. It should be noted that while the couplings 244a-d are described and illustrated herein as comprising quick disconnect couplings, any coupling that enables fluid communication between the chamber 208 and the combustor plenum 136 via the outlet conduit 204 may be employed.

In this example, the at least one valve 206 includes the first valve 206a and the second valve 206b, which are coupled to an installation interface 259 adjacent to the gas turbine engine 100. The first valve 206a and the second valve 206b are each one-way valves. The first valve 206a is fluidly coupled to the first conduit section 218 and is fluidly coupled to the second conduit section 220 to selectively enable pressurized fluid, with entrained particles, to flow from the chamber 208 into the gas turbine engine 100. The second valve 206b is fluidly coupled to the fourth conduit section 242 of the outlet conduit 204 to selectively enable the pressurized air bled from the combustor plenum 136 to flow into the chamber 208. In one example, the first valve 206a and the second valve 206b are each manual one-way two-port valves, such that user input to a lever or actuator coupled to the respective one of the first valve 206a and the second valve 206b moves a valve member or disc associated with the respective one of the first valve 206a and the second valve 206b between the opened and closed positions. Generally, a user may manipulate the lever or actuator, by rotating the lever or actuator for example, to move the valve member or disc from an opened position, in which fluid flows through the respective one of the first valve 206a and the second valve 206b; and a closed position, in which fluid is inhibited or prevented from flowing through the respective one of the first valve 206a and the second valve 206b. While the first valve 206a and the second valve 206b are described herein as being manually actuated, it will be understood that one or both of the first valve 206a and the second valve 206b may be responsive to control signals received from a controller to move the valve member or disc of the first valve 206a and the second valve 206b into the opened or closed positions.

The chamber 208 includes housing 260 having a chamber inlet 262 and a chamber outlet 264. The chamber inlet 262 is fluidly coupled to the outlet conduit 204 to receive the pressurized air bled from the combustor plenum 136 of the gas turbine engine 100. The chamber outlet 264 is fluidly coupled to the inlet conduit 202 to supply the inlet conduit 202 with the cleaning fluid 216. The housing 260 substantially encloses a plurality of particles 266. The housing 260 may be cylindrical, rectangular, or any shape that enables the enclosure of the plurality of particles 266 and the generation of an entrained air stream. In this example, the housing 260 is rectangular, having a top side, a bottom side and a plurality of sidewalls that interconnect the top side and the bottom side to enclose the plurality of particles 266. Although not illustrated herein, the housing 260 may also include one or more wheels to enable the housing 260 to be easily maneuvered about the aircraft 99.

In one example, the chamber inlet 262 is defined through one of the plurality of sidewalls at or near the bottom side of the housing 260, and the chamber outlet 264 is defined through one of the plurality of sidewalls at or near the top side of the housing 260 in a vertical direction, such that as the pressurized air enters the chamber 208 it causes at least a portion of the plurality of particles 266 to be airborne. These airborne particles become entrained within pressurized air, which exits the chamber 208 via the chamber outlet 264. As used herein, "entrain" denotes to draw in and transport solid particles by a flow of a fluid. Thus, the pressurized air draws in and transports at least a portion of the plurality of particles 266 by the flow of the pressurized air through the chamber 208. The housing 260 is composed of any metal, metal alloy or polymer that is configured to withstand a pressure of the pressurized air received from the gas turbine engine 100 or external pressurized fluid source 408 (FIGS. 6-7). In one example, the housing 260 is configured to withstand about 40 pounds per square inch (psi) higher than a maximum discharge operating pressure of the compressor section 104 associated with the gas turbine engine 100. For example, the housing 260 withstands a pressure from about 5.5 atmosphere (atm) to about 60 atmosphere (atm). In this example, the housing 260 withstands a pressure of at least about 10.5 atmosphere (atm).

Thus, as the pressurized air from the diffuser and deswirl system 155 enters the chamber 208, a portion of the plurality of particles 266 become entrained within the pressurized air stream, and exit the chamber 208 as the cleaning fluid 216 via the chamber outlet 264. Stated another way, the cleaning fluid 216 comprises a portion of the plurality of particles 266, which are entrained within the pressurized air bled from the combustor plenum 136 of the gas turbine engine 100 as the pressurized air flows through the chamber 208. In other words, the cleaning fluid 216 supplied by the inlet conduit 202 through the end wall 232 of the diffuser and deswirl system 155 is a pressurized fluid with an entrained portion of the plurality of particles 266.

In one example, the plurality of particles 266 is a plurality of particles of aluminum oxide, $Al_2O_3$, which have a predetermined particle size distribution. In one example, the size distribution of the particles of aluminum oxide is between about 3.5 micrometers to about 200 micrometers. In a further example, the size distribution of the particles of aluminum oxide is between about 3.5 micrometers to about 80 micrometers. In this example, the plurality of particles 266 is particles of aluminum oxide with a size distribution between about 40 micrometers to about 80 micrometers. As aluminum oxide is chemically inert, any particles remaining after cleaning will not adversely affect the operation of the gas turbine engine 100. The size distribution of the plurality of particles 266 also reduces potential erosion to downstream components, while effectively cleaning the plurality of cooling passages 146. In this regard, as the entrained portion of the plurality of particles 266 enters the combustor section 106, the size distribution of the plurality of particles 266 causes the particles to separate from the pressurized air and enter the inlets 158 of respective ones of the plurality of cooling passages 146. As the plurality of particles 266 enter the respective inlets 158, the plurality of particles 266 impinge upon the accumulated fine particles 164 (FIG. 1), and dislodge the accumulated fine particles 164 from the respective plurality of cooling passages 146, thereby cleaning the plurality of cooling passages 146.

With reference to FIG. 5, and continued reference to FIGS. 1-4, an exemplary method 300 for cleaning the one or more cooling passages 146 of the combustion chamber 124 is shown. In one example, the method begins at 302. At 304, the inlet conduit 202 is fluidly coupled between the chamber outlet 264 and the end wall 232 of the diffuser and deswirl system 155. In this example, the first conduit section 218 is coupled to the chamber outlet 264, via the coupling 222a, and the first conduit section 218 is fluidly coupled to the second conduit section 220 via the first valve 206a. The first valve 206a is coupled to the first conduit section 218 by the coupling 222b and the second conduit section 220 is coupled to the first valve 206a by the coupling 222c at the installation interface 259 while the first valve 206a is in the closed position. The second conduit section 220 is fluidly coupled to the end wall 232 of the diffuser and deswirl system 155 via the coupling 222d, such that the second conduit section 220 is contained substantially wholly within the gas turbine engine 100.

At 306, the outlet conduit 204 is fluidly coupled between the combustor plenum 136 and the chamber inlet 262 such that the outlet conduit 204 is downstream from the inlet conduit 202. In this example, the third conduit section 240 is coupled to the combustor plenum 136, via the coupling 244a, and the third conduit section 240 is fluidly coupled to the fourth conduit section 242 via the second valve 206b. The second valve 206b is coupled to the third conduit section 240 by the coupling 244b and the fourth conduit section 242 is coupled to the second valve 206b by the coupling 244c at the installation interface 259 while the second valve 206b is in the closed position. The third conduit section 240 is contained substantially wholly within the gas turbine engine 100. The fourth conduit section 242 is fluidly coupled to the chamber inlet 262 via the coupling 244d.

At 308, the gas turbine engine 100 is started. The starting of the gas turbine engine 100 may be performed via known ways, such as an input to a controller associated with the gas turbine engine 100. At 310, the second valve 206b is moved from the closed position to the opened position, by moving the lever or actuator coupled to the second valve 206b to manually move the valve member or disc to open the second valve 206b and enable fluid to flow through the second valve 206b. At 312, the pressurized fluid bled from the combustor plenum 136 is received through the outlet conduit 204. Stated another way, at 312, the pressurized fluid, in this example, pressurized air, is received from a source, which in this example, is the combustor plenum 136 of the gas turbine engine 100.

At 314, the pressurized fluid or air is directed through the chamber inlet 262 such that a portion of the plurality of particles 266 within the chamber 208 is entrained within the pressurized fluid or air. At 316, the first valve 206a is moved from the closed position to the opened position, by moving the lever or actuator coupled to the first valve 206a to manually move the valve member or disc to open the first valve 206a and enable fluid to flow through the first valve 206a. At 318, the pressurized fluid with the entrained portion of the plurality of particles (i.e. the cleaning fluid 216) is injected downstream from the compressor section 104 and upstream from the combustion chamber 124 through the end wall 232 of the diffuser and deswirl system 155 to clean the one or more cooling passages 146 of the combustion chamber 124. The method ends at 320.

The cleaning of the one or more cooling passages 146 may be ended at any time, by manually moving the first valve 206a from the opened position to the closed position, by moving the lever or actuator coupled to the valve member or disc, for example. The second valve 206b may then be moved from the opened position to the closed position, by moving the lever or actuator coupled to the valve member or disc, for example. The chamber 208 may be disconnected from the installation interface 259 by disconnecting the coupling 222b from the first valve 206a and the coupling 244c from the second valve 206b.

It should be noted that the configuration of the cooling passage cleaning system 200 as described herein is not limited to the configuration shown in FIGS. 1-5. In this regard, with reference to FIG. 6, a cooling passage cleaning system 400 is shown for use with the gas turbine engine 100. As the cooling passage cleaning system 400 is similar to the cooling passage cleaning system 200 discussed with regard to FIGS. 1-5, only the differences between the cooling passage cleaning system 200 and the cooling passage cleaning system 400 will be discussed in great detail herein, and the same reference numerals will be used to denote the same or similar components.

Figure 6:
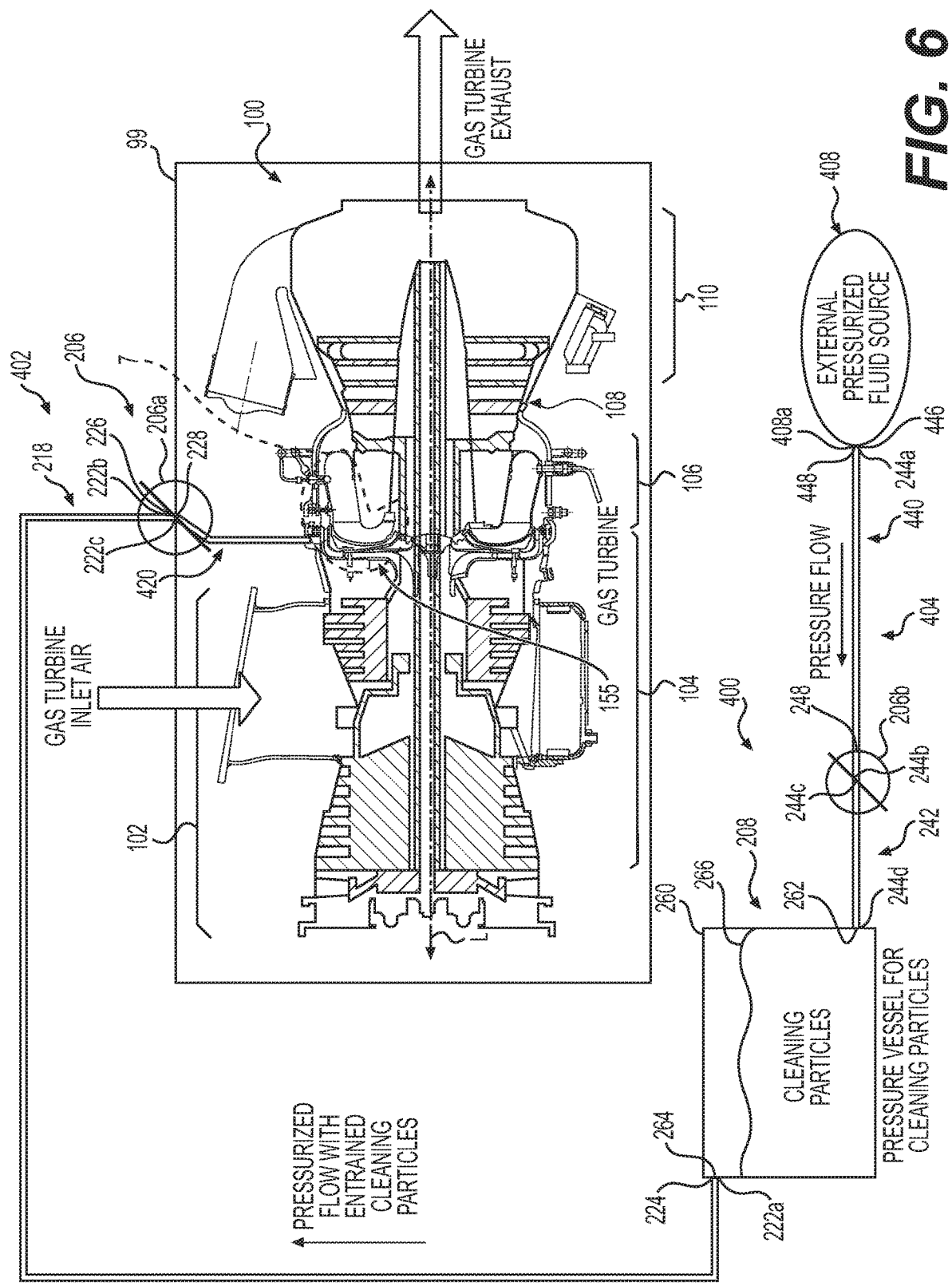
FIG. 6 is a schematic cross-sectional illustration of the gas turbine engine including another cooling passage cleaning system according to the various teachings of the present disclosure.

With reference to FIG. 6, the cooling passage cleaning system 400 includes a first or inlet conduit 402, a second or outlet conduit 404, the at least one valve 206, the particle chamber or chamber 208 and an external pressurized fluid source 408. The cooling passage cleaning system 400 may also include a controller and a user device, which is in communication with the controller to receive input commands to open or close the first valve 206a and the second valve 206b for cleaning the accumulated fine particles 164 from each of the plurality of cooling passages 146 of the combustion chamber 124.

The first or inlet conduit 402 is coupled to the chamber 208 and to the gas turbine engine 100. The inlet conduit 402 fluidly couples the chamber 208 to the diffuser and deswirl system 155 of the gas turbine engine 100 to enable the introduction of a cleaning fluid 216' into the gas turbine engine 100. In one example, the inlet conduit 402 includes the first conduit section 218, a second conduit section 420 and the plurality of couplings 222a-d. It will be understood, however, that the inlet conduit 402 may comprise a single conduit between the chamber 208 and the diffuser and deswirl system 155, if desired.

Figure 7:
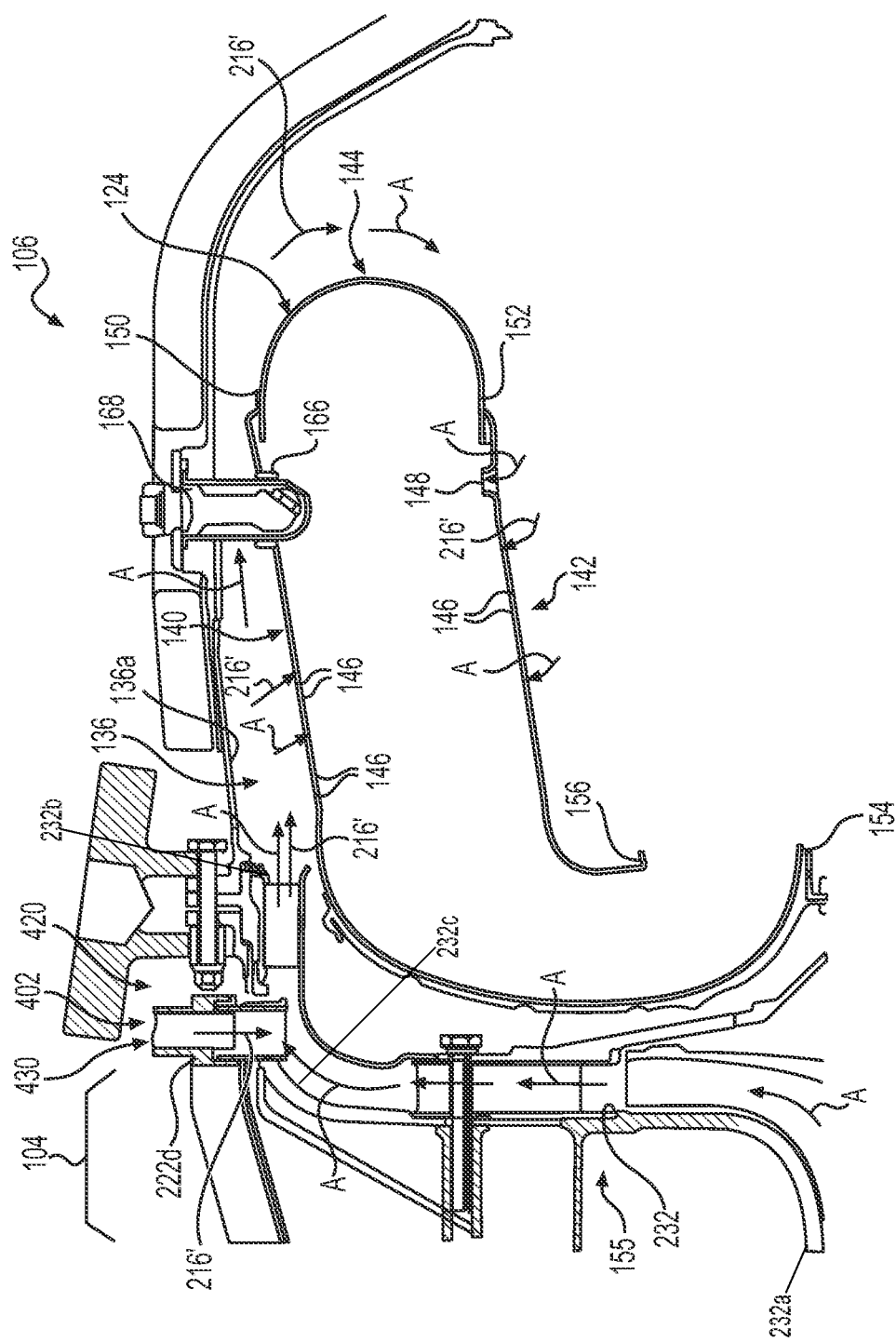
FIG. 7 is a detail cross-sectional illustration of a portion of the gas turbine engine of FIG. 6, identified at 7 in FIG. 6, which includes a portion of the cooling passage cleaning system.

The second conduit section 420 is disposed substantially entirely or wholly within the aircraft 99, and is a flexible pneumatic hose. The second conduit section 420 includes the second inlet end 228 and a second outlet end 430. The second inlet end 228 includes the coupling 222c, which fluidly couples the second conduit section 420 to the first valve 206a such that movement of the first valve 206a to the opened position fluidly couples the second conduit section 420 to the first conduit section 218. With reference to FIG. 7, the second outlet end 430 includes the coupling 222d, which fluidly couples the second conduit section 420 to the end wall 232 of the diffuser and deswirl system 155. Generally, the second conduit section 420 is coupled to the end wall 232 of the diffuser and deswirl system 155 such that the inlet conduit 402 is downstream from the compressor section 104; and upstream from the combustion chamber 124. The end wall 232 has a first end 232a proximate the compressor section 104 and a second end 232b proximate the combustor section 106, with a curved portion 232c defined between the first end 232a and the second end 232b of the end wall 232. The coupling 222d may be received within a bore defined through the end wall 232 or may be disposed about a bore defined through the end wall 232 to enable fluid communication between the chamber 208 and the diffuser and deswirl system 155 via the end wall 232. In one example, the second outlet end 430 is coupled to the end wall 232 to be transverse to the longitudinal axis L of the gas turbine engine 100. It should be noted that the position of the second outlet end 430 in FIG. 7 is merely an example. In this regard, the second outlet end 403 may be coupled to the gas turbine engine 100 at any location between the end wall 232 and the combustor plenum 136.

With reference to FIG. 6, the second or outlet conduit 404 is coupled to the external pressurized fluid source 408 and to the chamber 208. The outlet conduit 404 fluidly couples the external pressurized fluid source 408 to the chamber 208 to enable the chamber 208 to be pressurized with air from the external pressurized fluid source 408. In one example, the outlet conduit 404 includes a third conduit section 440, the fourth conduit section 242 and the second plurality of couplings 244a-d. It will be understood, however, that the outlet conduit 404 may comprise a single conduit between the external pressurized fluid source 408 and the chamber 208, if desired.

In this example, the third conduit section 440 is a flexible pneumatic hose. The third conduit section 440 includes a third inlet end 446 and the third outlet end 248. The third inlet end 446 includes the coupling 244a, which fluidly couples the third inlet end 446 to the external pressurized fluid source 408. The coupling 244a may be coupled to a coupling 408a of the external pressurized fluid source 408 to enable fluid communication between the external pressurized fluid source 408 and the chamber 208. The third outlet end 248 includes the coupling 244b, which fluidly couples the third conduit section 440 to the second valve 206b. Generally, the fourth conduit section 242 is coupled to the chamber 208 to provide the chamber 208 with pressurized air from the external pressurized fluid source 408.

The external pressurized fluid source 408 is a source of pressurized air, which is external to or remote from the gas turbine engine 100. In one example, the external pressurized fluid source 408 is a compressor, which is capable of compressing the air to a pressure of about 40 pounds per square inch (psi) higher than a maximum discharge operating pressure of the compressor section 104 associated with the gas turbine engine 100. For example, the external pressurized fluid source 408 compresses the air to a pressure ranging from about 5.5 atmosphere (atm) to about 60 atmosphere (atm). In this example, the external pressurized fluid source 408 compresses the air to at least about 10.5 atmosphere (atm). The external pressurized fluid source 408 includes the coupling 408a at an outlet 448. The coupling 408a is a pneumatic quick disconnect coupling that enables fluid communication between the third conduit section 440 and the external pressurized fluid source 408. It should be noted that while the coupling 408a is described and illustrated herein as comprising a quick disconnect coupling, any coupling that enables fluid communication between the chamber 208 and the external pressurized fluid source 408 via the outlet conduit 404 may be employed.

As the pressurized air from the external pressurized fluid source 408 enters the chamber 208, a portion of the plurality of particles 266 become entrained within the pressurized air stream, and exit the chamber 208 as the cleaning fluid 216' via the chamber outlet 264. Stated another way, the cleaning fluid 216' comprises a portion of the plurality of particles 266, which are entrained within the pressurized air from the external pressurized fluid source 408 as the pressurized air flows through the chamber 208. In other words, with reference to FIG. 7, the cleaning fluid 216' supplied by the inlet conduit 402 through the end wall 232 of the diffuser and deswirl system 155 is a pressurized fluid with an entrained portion of the plurality of particles 266.

Figure 8:
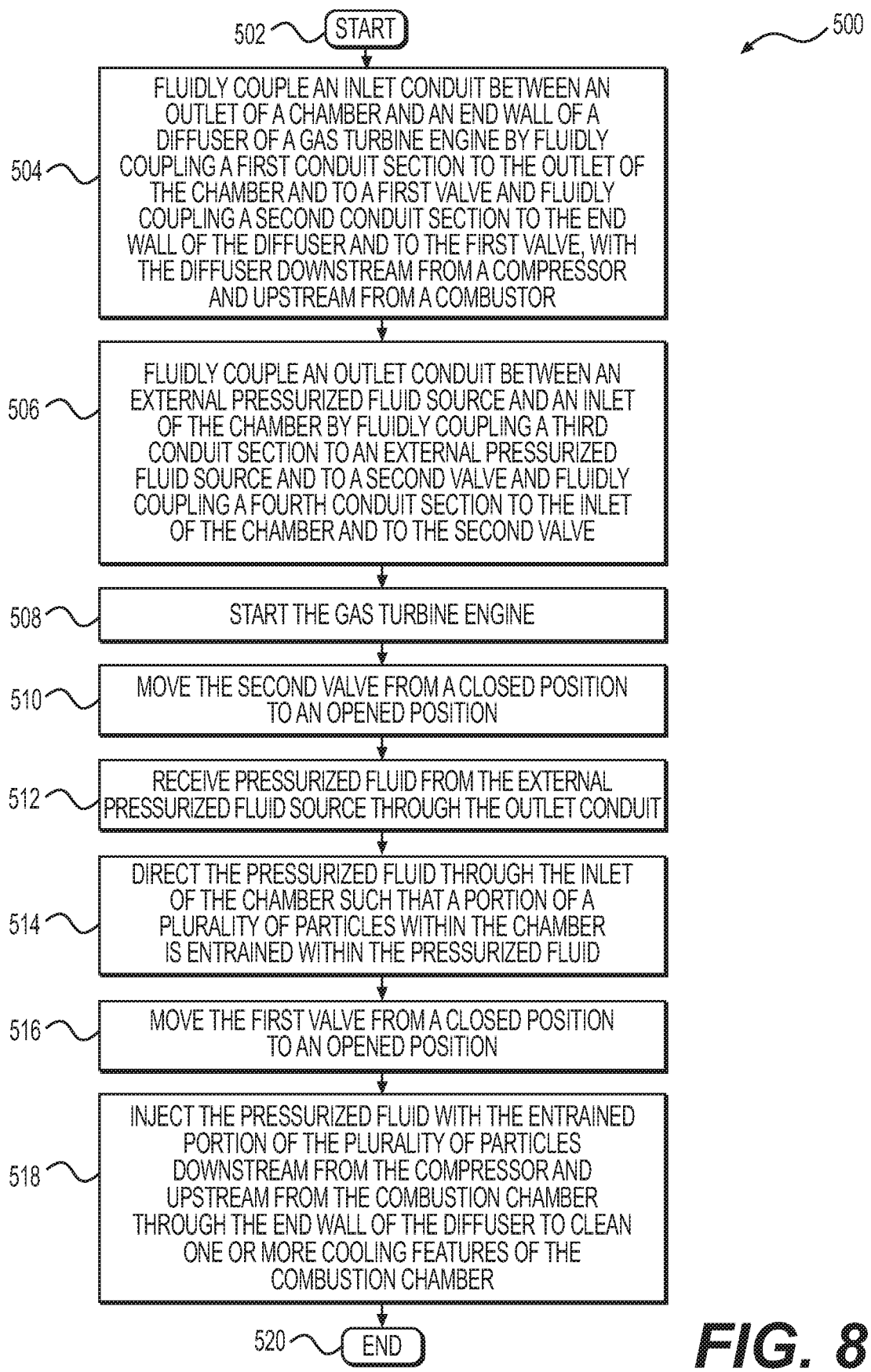
FIG. 8 is a flow chart illustrating an exemplary method for cleaning the plurality of cooling passages of the combustion chamber of the gas turbine engine with the cooling passage cleaning system of FIG. 6.

With reference to FIG. 8, and continued reference to FIGS. 6-7, an exemplary method 500 for cleaning the one or more cooling passages 146 of the combustion chamber 124 is shown. In one example, the method begins at 502. At 504, the inlet conduit 402 is fluidly coupled between the chamber outlet 264 and the end wall 232 of the diffuser and deswirl system 155. In this example, the first conduit section 218 is coupled to the chamber outlet 264, via the coupling 222a, and the first conduit section 218 is fluidly coupled to the second conduit section 420 via the first valve 206a. The first valve 206a is coupled to the first conduit section 218 by the coupling 222b and the second conduit section 420 is coupled to the first valve 206a by the coupling 222c while the first valve 206a is in the closed position. The second conduit section 420 is fluidly coupled to the end wall 232 of the diffuser and deswirl system 155 via the coupling 222d, such that the second conduit section 420 is contained substantially wholly within the gas turbine engine 100.

At 506, the outlet conduit 404 is fluidly coupled between the external pressurized fluid source 408 and the chamber inlet 262. In this example, the third conduit section 440 is coupled to the external pressurized fluid source 408, via the coupling 244a, and the third conduit section 440 is fluidly coupled to the fourth conduit section 242 via the second valve 206b. The second valve 206b is coupled to the third conduit section 440 by the coupling 244b and the fourth conduit section 242 is coupled to the second valve 206b by the coupling 244c while the second valve 206b is in the closed position. The fourth conduit section 242 is fluidly coupled to the chamber inlet 262 via the coupling 244d.

At 508, the gas turbine engine 100 is started. The starting of the gas turbine engine 100 may be performed via known ways, such as an input to a controller associated with the gas turbine engine 100. At 510, the second valve 206b is moved from the closed position to the opened position, by moving the lever or actuator coupled to the second valve 206b to manually move the valve member or disc to open the second valve 206b and enable fluid to flow through the second valve 206b. At 512, the pressurized fluid from the external pressurized fluid source 408 is received through the outlet conduit 204. Stated another way, at 512, the pressurized fluid, in this example, pressurized air, is received from a source, which in this example, is the external pressurized fluid source 408 that is remote from the gas turbine engine 100.

At 514, the pressurized fluid or air is directed through the chamber inlet 262 such that a portion of the plurality of particles 266 within the chamber 208 is entrained within the pressurized fluid or air. At 516, the first valve 206a is moved from the closed position to the opened position, by moving the lever or actuator coupled to the first valve 206a to manually move the valve member or disc to open the first valve 206a and enable fluid to flow through the first valve 206a. At 518, the pressurized fluid with the entrained portion of the plurality of particles (i.e. the cleaning fluid 216') is injected downstream from the compressor section 104 and upstream from the combustion chamber 124 through the end wall 232 of the diffuser and deswirl system 155 to clean the one or more cooling passages 146 of the combustion chamber 124. The method ends at 520.

The cleaning of the one or more cooling passages 146 may be ended at any time, by manually moving the first valve 206a from the opened position to the closed position, by moving the lever or actuator coupled to the valve member or disc, for example. The second valve 206b may then be moved from the opened position to the closed position, by moving the lever or actuator coupled to the valve member or disc, for example. The chamber 208 may be disconnected from the gas turbine engine 100 by disconnecting the coupling 222b from the first valve 206a.

Thus, the cooling passage cleaning system 200, 400 removes the accumulated fine particles 164 (FIG. 3) from the plurality of cooling passages 146 without requiring the gas turbine engine 100 to be uninstalled from the aircraft 99. This reduces maintenance time and cost. Moreover, as the cooling passage cleaning system 200 may bleed air from the combustor plenum 136 of the gas turbine engine 100 while the gas turbine engine 100 is running, the cooling passage cleaning system 200 may not require a separate pressure source, which may enable the cooling passage cleaning system 200 to operate in rural or remote locations. Further, the use of aluminum oxide for the plurality of particles 266, which is inert, enables the plurality of cooling passages 146 to be cleaned by the cooling passage cleaning system 200, 400 and any particle residue to be safely exhausted by the operation of the gas turbine engine 100. The size distribution of the plurality of particles 266 also enables the plurality of cooling passages 146 to be cleaned by the cooling passage cleaning system 200, 400 substantially without erosion to downstream components, such as the turbines of the turbine section 108.

Further, it should be noted that the configuration of the cooling passage cleaning system 200, 400 as described herein is not limited to the configuration shown in FIGS. 1-8. In this regard, while the cooling passage cleaning system 200, 400 is described and illustrated herein as comprising a single cooling passage cleaning system 200, 400, a plurality of cooling passage cleaning systems 200, 400 may be coupled to the gas turbine engine 100 about a circumference of the end wall 232 of the diffuser and deswirl system 155. Moreover, while the cooling passage cleaning system 200, 400 are described herein as including the first valve 206a and the second valve 206b, the cooling passage cleaning system 200, 400 may be coupled to the gas turbine engine 100 via one or more plugs.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for cleaning one or more cooling passages associated with a combustion chamber of a combustor section of a gas turbine engine, the gas turbine engine having a compressor section upstream from the combustor section, the method comprising:
receiving a pressurized fluid from a source;
directing the pressurized fluid through an inlet of a chamber such that a portion of a plurality of particles within the chamber is entrained within the pressurized fluid;
coupling an inlet conduit to an outlet of the chamber and an end wall of a diffuser and deswirl system, the end wall having a first end proximate the compressor section and a second end proximate the combustor section, with a straight portion and a curved portion defined between the first end and the second end of the end wall, the straight portion extends from proximate the first end to the curved portion, the curved portion extends from the straight portion to proximate the second end, the second end to direct a working fluid flow in an axial direction relative to a longitudinal axis of the gas turbine engine into a combustor plenum, and an outlet end of the inlet conduit is coupled to the curved portion of the end wall such that an outlet of the outlet end extends along an axis transverse to the longitudinal axis of the gas turbine engine, the outlet end radially outboard of the first end;
injecting the pressurized fluid with the entrained portion of the plurality of particles downstream from the compressor section through the curved portion of the end wall of the diffuser and deswirl system proximate the second end upstream from the combustor plenum of the combustor section via the outlet end of the inlet conduit to direct the pressurized fluid with the entrained portion of the plurality of particles in the axial direction at the second end to clean the one or more cooling passages associated with the combustion chamber; and
starting the gas turbine engine prior to receiving the pressurized fluid from the source, with the operating of the gas turbine engine exhausting residue of the plurality of particles through an exhaust system of the gas turbine engine.

2. The method of claim 1, wherein the source is an external pressurized fluid source remote from the gas turbine engine.

3. The method of claim 2, wherein the method further comprises:
coupling an outlet conduit to the external pressurized fluid source and the inlet of the chamber.

4. The method of claim 1, wherein the plurality of particles comprise a plurality of aluminum oxide particles having a size distribution between 3.5 micrometers and 80 micrometers.

5. A system for cleaning one or more cooling passages associated with a combustion chamber of a gas turbine engine, the gas turbine engine including a compressor section upstream from the combustion chamber and a diffuser and deswirl system downstream from the compressor section, the compressor section, combustion chamber and diffuser and deswirl system extending along a longitudinal axis of the gas turbine engine, the system comprising:
a source of a pressurized fluid;
a chamber including a plurality of particles having a predetermined particle size distribution, the chamber having an inlet in fluid communication with the source to receive the pressurized fluid and an outlet in fluid communication with an end wall of the diffuser and deswirl system via an inlet conduit, and at least a portion of the plurality of particles entrained in the pressurized fluid flows through the inlet conduit to clean the one or more cooling passages associated with the combustion chamber;
an outlet conduit fluidly coupled to the source of the pressurized fluid and the inlet of the chamber; and
the inlet conduit fluidly coupled to the outlet of the chamber and the end wall of the diffuser and deswirl system, the end wall having a first end proximate the compressor section and a second end proximate the combustor section, with a straight portion and a curved portion defined between the first end and the second end of the end wall, the straight portion extends from proximate the first end to the curved portion, the curved portion extends from the straight portion to proximate the second end, the second end to direct a working fluid flow in an axial direction relative to the longitudinal axis, an outlet end of the inlet conduit is coupled to the curved portion of the end wall downstream from the compressor section and upstream from a combustor plenum in a direction of the working fluid flow through the gas turbine engine and an outlet of the outlet end extends along an axis transverse to the longitudinal axis such that the pressurized fluid is injected into the end wall of the diffuser and deswirl system upstream from the second end and the combustor plenum to flow in the axial direction at the second end into the combustor plenum, the outlet end radially outboard of the first end of the end wall.

6. The system of claim 5, wherein the source is an external pressurized fluid source remote from the gas turbine engine.

7. The system of claim 5, wherein the outlet conduit includes a third conduit section fluidly coupled to a fourth conduit section with a valve coupled between the third conduit section and the fourth conduit section, the third conduit section fluidly coupled to the external pressurized fluid source, the fourth conduit section fluidly coupled to the inlet of the chamber.

8. The system of claim 7, wherein the inlet conduit includes a first conduit section fluidly coupled to a second conduit section with a valve coupled between the first conduit section and the second conduit section, the first conduit section fluidly coupled to the outlet of the chamber, the second conduit section fluidly coupled to the end wall of the diffuser and deswirl system, and the second conduit section is contained substantially wholly within the gas turbine engine.

9. The system of claim 5, wherein the plurality of cooling passages comprise a plurality of effusion cooling holes defined through at least one wall of the combustion chamber.

10. The system of claim 5, wherein the plurality of particles comprise a plurality of aluminum oxide particles having a size distribution between 3.5 micrometers and 80 micrometers.

11. A system for cleaning one or more cooling passages associated with a combustion chamber of a gas turbine engine, the gas turbine engine including a compressor section upstream from the combustion chamber and a diffuser and deswirl system downstream from the compressor section, the compressor section, combustion chamber and diffuser and deswirl system extending along a longitudinal axis of the gas turbine engine, the system comprising:
   a chamber including a plurality of aluminum oxide particles having a predetermined particle size distribution, the chamber having an inlet and an outlet;
   an inlet conduit fluidly coupled to the outlet of the chamber and to an end wall of the diffuser and deswirl system, the end wall defining a straight portion and a curved portion between a first end of the end wall and a second end of the end wall, the straight portion extending from proximate the first end to the curved portion, and the curved portion extending from the straight portion to proximate the second end, the second end to direct a working fluid flow in an axial direction relative to the longitudinal axis into a combustor plenum, an outlet end of the inlet conduit radially outboard of the first end, the first end of the end wall upstream from the second end of the end wall, the outlet end of the inlet conduit coupled to the curved portion of the end wall of the diffuser and deswirl system downstream from the compressor section and upstream from a combustor plenum in a direction of the working fluid flow through the gas turbine engine such that the pressurized fluid is injected into the working fluid flow at the curved portion of the end wall of the diffuser and deswirl system upstream from the combustor plenum to flow in the axial direction at the second end, and an outlet of the outlet end extends along an axis transverse to the longitudinal axis of the gas turbine engine and is proximate the second end; and
   an outlet conduit fluidly coupled to an external pressurized fluid source and the inlet of the chamber, the outlet conduit directs pressurized fluid from the external pressurized fluid source into the chamber, and the pressurized fluid entrains at least a portion of the plurality of particles, and the pressurized fluid with the entrained portion of the plurality of particles is injected via the inlet conduit through the end wall of the diffuser and deswirl system to flow clean the one or more cooling passages associated with the combustion chamber.

12. The system of claim 11, wherein the predetermined particle size distribution is between 3.5 micrometers and 80 micrometers.

13. The system of claim 11, wherein the inlet conduit includes a first conduit section fluidly coupled to a second conduit section with a valve coupled between the first conduit section and the second conduit section, the first conduit section fluidly coupled to the outlet of the chamber, the second conduit section fluidly coupled to the end wall of the diffuser and deswirl system, and the second conduit section is contained substantially wholly within the gas turbine engine.

14. The system of claim 11, wherein the plurality of cooling passages comprise a plurality of effusion cooling holes defined through at least one wall of the combustion chamber.

* * * * *